United States Patent
Chang et al.

(10) Patent No.: US 9,645,624 B2
(45) Date of Patent: May 9, 2017

(54) ELECTRONIC APPARATUS, FUNCTIONAL UNIT, AND POWER-DOWN METHOD THEREOF

(71) Applicant: REALTEK SEMICONDUCTOR CORP., Hsinchu (TW)

(72) Inventors: Cheng-Pin Chang, Taipei (TW); Tsung-Peng Chuang, Hsinchu County (TW); Sheng-Nan Chiu, Hsinchu (TW); Chih-Jung Yu, Taichung (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 191 days.

(21) Appl. No.: 14/320,748

(22) Filed: Jul. 1, 2014

(65) Prior Publication Data

US 2015/0198986 A1  Jul. 16, 2015

(30) Foreign Application Priority Data

Jan. 10, 2014 (TW) .............................. 103100999 A

(51) Int. Cl.
*G06F 1/32* (2006.01)
*G06F 1/26* (2006.01)

(52) U.S. Cl.
CPC .............. *G06F 1/26* (2013.01); *G06F 1/3203* (2013.01)

(58) Field of Classification Search
CPC ................................. G06F 1/26; G06F 1/3203
USPC ............................................................ 713/2
See application file for complete search history.

(56) References Cited

U.S. PATENT DOCUMENTS

| 4,388,644 | A | * | 6/1983 | Ishman | ................... | H04H 60/43 |
| | | | | | | 348/E7.072 |
| 5,367,697 | A | * | 11/1994 | Barlow | ............... | G06F 11/1441 |
| | | | | | | 713/330 |
| 5,586,333 | A | * | 12/1996 | Choi | ..................... | G06F 1/3203 |
| | | | | | | 713/320 |
| 5,642,104 | A | * | 6/1997 | Erwin | ............... | H05B 37/0227 |
| | | | | | | 307/141 |

(Continued)

FOREIGN PATENT DOCUMENTS

| TW | 200727130 | | 7/2007 |
| TW | 200841158 | A | 10/2008 |

(Continued)

*Primary Examiner* — Thomas Lee
*Assistant Examiner* — Volvick Derose
(74) *Attorney, Agent, or Firm* — Li & Cai Intellectual Property (USA) Office

(57) ABSTRACT

An electronic apparatus comprises a switch, a processing unit, a functional unit and a power management unit. The function unit has a timer. The power management unit is coupled to the processing unit and the function unit. The processing unit and the function unit receive a switch signal generated by the switch. The processing unit generates a power-down signal after detecting a change in the logic level of the switch signal received for a first predetermined time. The timer starts counting upon detecting a change in the logic level of the switch signal, and executes a power-down procedure after the timer has counted to a second predetermined time. The second time is less than the first predetermined time. The function unit completes the power-down procedure before the power management unit receives the power-down signal and stops powering the processing unit and the function unit.

9 Claims, 8 Drawing Sheets

(56) References Cited

U.S. PATENT DOCUMENTS

| | | | | |
|---|---|---|---|---|
| 5,781,770 A * | 7/1998 | Byers | | G06F 11/1438 713/502 |
| 6,526,536 B1 * | 2/2003 | Chen | | G06F 11/0751 365/195 |
| 6,587,951 B1 * | 7/2003 | Flanigan | | G06F 1/26 713/300 |
| 8,095,808 B2 * | 1/2012 | Perng | | G06F 1/26 713/300 |
| 2001/0043091 A1 * | 11/2001 | Hall | | H02M 3/33523 327/108 |
| 2006/0066757 A1 * | 3/2006 | Numata | | H04N 5/60 348/730 |
| 2006/0072251 A1 * | 4/2006 | Ross | | G05B 9/02 361/1 |
| 2006/0287805 A1 * | 12/2006 | Enomoto | | F02D 41/26 701/113 |
| 2007/0030613 A1 * | 2/2007 | Sousa | | H04W 52/281 361/92 |
| 2008/0204095 A1 * | 8/2008 | Cho | | G11C 7/1072 327/158 |
| 2008/0301484 A1 * | 12/2008 | Abe | | G06F 1/3287 713/502 |
| 2009/0147610 A1 * | 6/2009 | Shikata | | G11C 29/021 365/226 |
| 2010/0215139 A1 * | 8/2010 | Lin | | H03K 21/38 377/47 |
| 2010/0266144 A1 * | 10/2010 | Chiu | | H03G 3/34 381/106 |
| 2010/0328831 A1 * | 12/2010 | Zhang | | H02M 1/32 361/93.1 |
| 2011/0183727 A1 * | 7/2011 | Kato | | H04W 52/0293 455/574 |
| 2011/0188163 A1 * | 8/2011 | Ando | | H03K 5/22 361/57 |
| 2011/0313587 A1 * | 12/2011 | Lin | | H02H 3/0935 700/296 |
| 2012/0084585 A1 * | 4/2012 | Yokoyama | | G06F 1/3284 713/320 |
| 2012/0266006 A1 * | 10/2012 | Chen | | G06F 11/2284 713/340 |
| 2013/0266153 A1 * | 10/2013 | Nie | | H04R 3/007 381/94.5 |
| 2014/0143574 A1 * | 5/2014 | Ma | | G06F 1/3234 713/323 |
| 2014/0146581 A1 * | 5/2014 | Tsou | | H02M 3/33507 363/21.18 |
| 2014/0232205 A1 * | 8/2014 | Li | | H02J 9/005 307/125 |

FOREIGN PATENT DOCUMENTS

| | | |
|---|---|---|
| TW | 200947195 A | 11/2009 |
| TW | 201342944 A | 10/2013 |

* cited by examiner

ELECTRONIC APPARATUS, FUNCTIONAL UNIT, AND POWER-DOWN METHOD THEREOF

BACKGROUND

1. Technical Field

The present disclosure relates to an electronic apparatus, more particular, to a function unit, an electronic apparatus, and a power-down method thereof, for preventing malfunction resulting from hard powering down the electronic apparatus.

2. Description of Related Art

As technology advances, handheld electronic devices, such as smart phones, MP3 player, and personal digital assistants (PDAs) have become increasingly popular and widespread. As the industry continues to develop a variety of features and functions, such as the media player, for these devices. Handheld electronic devices have gradually become indispensable necessities in the modern life.

However, as the industry continues to add more and more features and functions to the handheld electronic devices, the overall complexity of the handheld electronic devices and operational loadings on the processing unit thereof increases as well. Moreover, the handheld electronic device may crash when the processing unit overloads. The conventional handheld electronic devices are equipped with hard power down mechanism for forcing the handheld electronic device to shutdown. However the conventional hard power down mechanism merely forcing the handheld electronic device to shut-down and restart by interrupting the operating power supplied. Under this method, internal circuits could easily generate errors and become malfunction due to sudden interruption of power.

For example, please refer to FIG. 1, which shows a diagram of a conventional electronic apparatus. The electronic apparatus 1 includes a switch 11, a processing unit 12, an audio codec 13, a power management unit 14, a battery 15, and a resistor R. A first end of the resistor R is coupled to a logic high level V+. A first end of the switch 11 is coupled to a second end of the resistor R, and a second end of the switch 11 is coupled to a logic low level V−. When the switch 11 is closed (e.g., being pressed), the first end and the second end of the switch 11 conduct; when the switch 11 is opened (e.g., not being pressed), the first end and the second end of the switch 11 are electrically isolated from each other. The processing unit 12 is coupled to the first end of the switch 11. The processing unit 12 is further coupled to the power management unit 14, and the audio codec 13. The processing unit 12 and the audio codec 13 further receive driving voltages 1.8V/3.3V/5V, which are supplied by the power management unit 14. The power management unit 14 is coupled to one end of the battery 15, and the other end of the battery 15 is coupled to a ground. Additionally, a speaker 16 and a headphone 17 are coupled to the audio codec 13 of the electronic apparatus 1.

Please refer to FIG. 2 in conjunction with FIG. 1, wherein FIG. 2 shows a waveform diagram illustrating an operation of the conventional electronic apparatus. When the switch 11 has been pressed by a user, a switch signal generated by the switch 11 would change from a logic high level V+ (e.g., 5V) to a logic low level V− (e.g., 0V). The processing unit 12 generates and outputs a power-down signal to the power management unit 14 to drive the power management unit 14 to stop supplying driving voltages T1 seconds after detected that the switch signal has changed from a logic high level V+ to a logic low level V−. As can be noted from point A of FIG. 2, after T1 seconds, the driving voltage signal transits from a logic high level V+ to a low voltage level and the power management unit 14 stop supplying driving voltages. As a result, driving voltages being supplied to the processing unit 12 and the audio codec 13 are interrupted, and the control signal outputted by the processing unit 12 for controlling the operation of the audio codec 13 is also interrupted at the same time.

When the control signal for controlling the operation of the audio codec 13 is suddenly interrupted, the speaker 16 and the headphone 17 being coupled to the audio codec 13 might generate pop noise causing discomfort to the user, or even scare the user and causing accident or harm to the user.

SUMMARY

The present disclosure provides an electronic apparatus, which includes a switch, a processing unit, a functional unit, and a power management unit. The function unit has a timer. The power management unit is coupled to the processing unit and the function unit, respectively. The processing unit and the function unit receive a switch signal generated by the switch. The processing unit generates a power-down signal after detecting a change in the logic level of the switch signal received for a first predetermined time. The timer starts counting upon detecting a change in the logic level of the switch signal, and executes a power-down procedure after the timer has counted to a second predetermined time. The second predetermined time is less than the first predetermined time. The function unit completes the power-down procedure before the power management unit receives the power-down signal and stops powering the processing unit and the function unit.

The present disclosure provides a function unit having a timer. The function unit is coupled to a power management unit and a processing unit, respectively. The processing unit and the function unit are coupled to a switch to receive a switch signal generated by the switch. The processing unit generates a power-down signal a first predetermined time after receiving the switch signal. The timer starts counting upon detecting a change in the logic level of the switch signal. The function unit executes a power-down procedure after the timer has counted to a second predetermined time. The second predetermined time is less than the first predetermined time. The function unit completes the power-down procedure before the power management unit receives the power-down signal and stops powering the processing unit and the function unit.

The present disclosure provides a power-down method for an electronic apparatus, and the power-down method includes following steps. A switch signal generated by a switch of the electronic apparatus is first detected. A processing unit and a timer of a function unit are simultaneously driven to start counting upon detected a change in the logic level of the switch signal. Next, the processing unit is driven to generate a power-down signal after counted to a first predetermined time. The function unit is driven to execute a power-down procedure after the timer has counted to a second predetermined time, wherein the second predetermined time is less than the first predetermined time. Thereafter, a power management unit is driven to stop powering the processing unit and the function unit upon receiving the power-down signal. The function unit completes the power-down procedure before the power management unit receives the power-down signal and stops powering the processing unit and the function unit.

To sum up, the electronic apparatus, the function unit and the power-down method provided by the present disclosure can prevent the electronic apparatus from malfunctioning caused by hard powering down interrupting the supplying power to the internal circuit when the system of the electronic apparatus crashes. More specifically, the electronic apparatus, the function unit and the power-down method not only enables the internal circuit of the electronic apparatus to execute the ordinary power-down process during the execution of hard power down process, but also further protect the internal circuit and preventing the hard power down from affecting the user experience.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Figure 1:
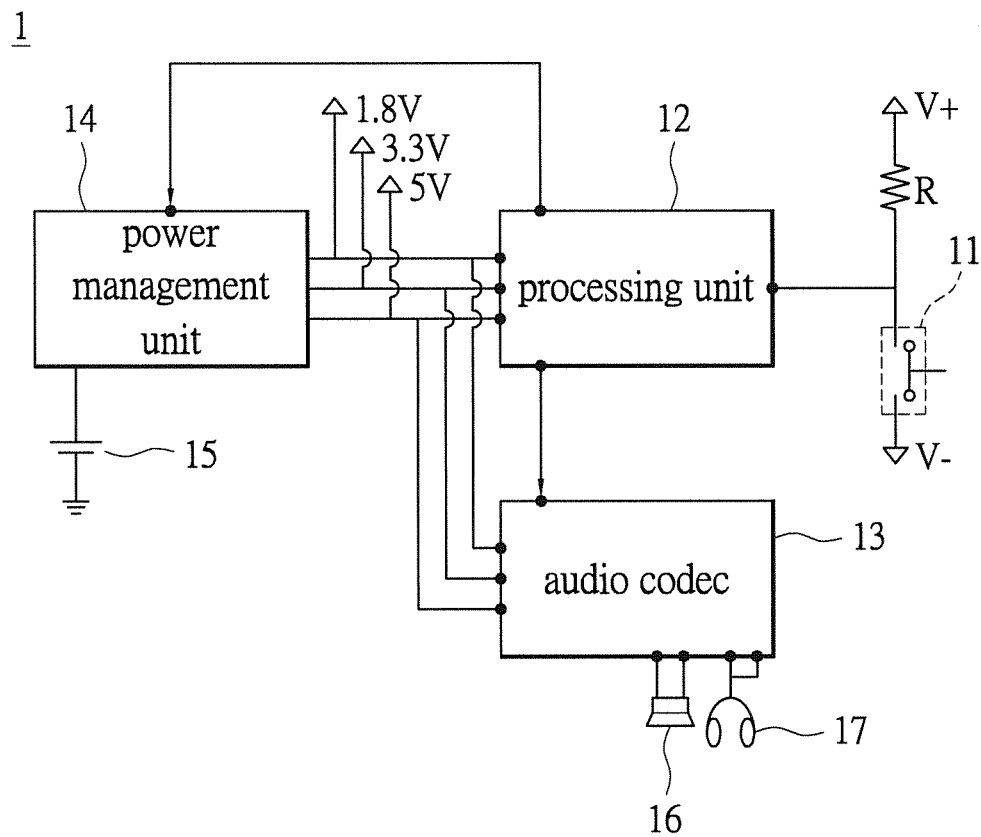
FIG. 1 is a diagram of a conventional electronic apparatus.

The aforementioned illustrations and following detailed descriptions are exemplary for the purpose of further explaining the scope of the present disclosure. Other objectives and advantages related to the present disclosure will be illustrated in the subsequent descriptions and appended drawings. Wherever possible, the same reference numbers are used in the drawings and the description to refer to the same or like parts.

Figure 3:
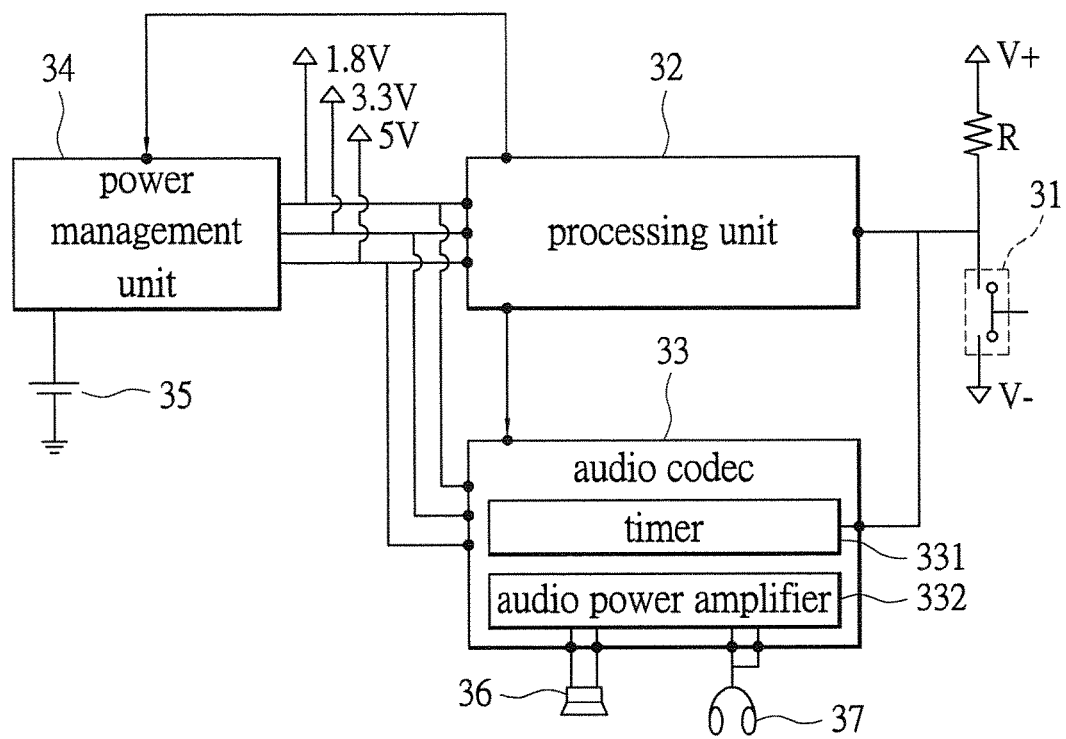
FIG. 3 is a circuit diagram of an electronic apparatus provided according to an exemplary embodiment of the present disclosure.

Please refer to FIG. 3, which shows a circuit diagram of an electronic apparatus provided according to an exemplary embodiment of the present disclosure. The electronic apparatus 3 includes a switch 31, a processing unit 32, an audio codec 33, a power management unit 34, a battery 35, and a resistor R. The audio codec 33 includes a timer 331. A first end of the resistor R is coupled to a logic high level V+. A first end of the switch 31 is coupled to a second end of the resistor R, and a second end of the switch 31 is coupled to a logic low level V−. When the switch 31 has been pressed (e.g., in a close state), the first end and the second end of the switch 31 conducts; when the switch 31 has not been pressed (e.g., in an open state), the first end and the second end of the switch 31 are electrically isolated from each other. The processing unit 32 and the audio codec 33 are coupled to the first end of the switch 31. The timer 331 of the audio codec 33 is coupled to the first end of the switch 31. The processing unit 32 is coupled to the power management unit 34. The processing unit 32 is coupled to the audio codec 33. The processing 32 and the audio codec 33 receive driving voltages 1.8V/3.3V/5V supplied by the power management unit 34. The power management unit 34 is coupled to one end of the battery 35, and the other end of the battery 35 is coupled to a ground. Additionally, the audio codec 33 of the electronic apparatus 3 is coupled to a speaker 36 and a headphone 37.

The switch 31 provides the user to control the power operation of the electronic apparatus 3. When the switch 31 has been pressed by the user, the logic level of a switch signal generated by switch 31 changes. The processing unit 32 and audio codec 33 operates upon receiving the switch signal. Particularly, in the instant embodiment, whenever the system of the electronic apparatus 3 crashes, the user can through pressing the switch 31 for a sufficient length of time hard power down the electronic apparatus 3. More specifically, the logic level of the switch signal generated by the switch 31 operative changes when the switch 31 being operated (e.g., being pressed) to initiate the hard power down operation and cause the processing unit 32 and the audio codec 33 to operate, wherein the switch signal is a continuous signal.

It is worth to note that the change in the logic level of the switch signal generated by the switch 31 in response to pressing operation may be from a logic high level V− (e.g., 5V) to a logic low level V+ (e.g., 0V) or from logic high level V+ to a logic low level V−. For example, in the instant embodiment, the first end and the second of the switch 31 are coupled to the logic high level V+ and the logic low level V−, respectively, wherein the logic high level V+ and the logic low level V− are supplied by the battery 35. As shown in FIG. 3, when the switch 31 of the electronic apparatus 3 has been pressed, the logic level of the switch signal outputted by the first end of the switch 31 instantly changes from logic high level V+ to logic low level V−. However, those skilled in the art should know that the switch signal can also change from a logic low level V− to a logic high level V+ when the switch 31 of the electronic apparatus 3 has been pressed to initiate hard power down operation. In other words, the present disclosure is not limited to the example provided herein.

The processing unit 32 handles and processes calculations required by the electronic apparatus 3 during the operation of the electronic apparatus 3. The processing unit 32 can be implemented by a center processing unit (CPU), microcontroller unit (MCU) or any other component or circuitry having computational capability. The processing unit 32 is operable to receive and process the switch signal generated by the switch. Moreover, the processing unit 32 is coupled to the power management unit 34. The processing unit 32 further controls the operation of the power management unit 34. The processing unit 32 is further coupled to a built-in function circuit in the electronic apparatus 3 (not shown). The processing unit 32 further performs signal transmission with the built-in function circuit and controlling the operation of the built-in function circuit.

More specifically, in the instant embodiment, take audio codec 33 as the built-in function unit for instant, the processing unit 32 transmits the voice signal and the control signal to the audio codec 33 to drive the audio codec 33 to execute audio playback operation. It is worth to note that the interface of the audio codec 33 coupled to the processing unit 32 in the instant embodiment can be an inter-integrated circuit (I²C) or any other equivalent data transmission interface. In one embodiment, the processing unit 32 starts counting upon detecting that the logic level of the switch signal has changed, i.e., changes from a logic high level V+ to a logic low level V−. The processing unit 32 generates a power-down signal and controls the power down operation after counted to a first predetermined time. In particular, the processing unit 32 transmits the power-down signal to the power management unit 34 the first predetermined time for further processing.

The audio codec 33 of instant embodiment includes a digital-to-analog converter and an analog-to-digital converter. The analog-to-digital converter converts the sound wave signal, which is an analog signal, to a digital electric signal. The audio codec 33 can also convert a digital electric signal to the sound wave signal using the digital-to-analog converter to perform playback on the speaker 36 or the headphone 37 through an audio power amplifier 332. In particular, the audio codec 33 can process and playback the audio signal on the speaker 36 or the headphone 37 through an audio power amplifier 332 after receiving the audio signal generated by the processing unit 32. The audio power amplifier 332 can be a headphone amplifier or a speaker amplifier, or a combination of both.

In addition, in the instant embodiment of the present disclosure, the audio codec 33 further includes the timer 331. The audio codec 33 drives the timer 331 to start counting upon detecting that the logic level of the switch signal received has changed from a logic high level V+ to a logic low level V−. After the timer 331 has counted to a second time, the audio codec 33 executes a power-down procedure thereof, and automatically turns off itself or disables a part of its function. Taking the audio codec 33 executing an ordinary power-down procedure for the audio power amplifier 332 while the audio power amplifier 332 receives the audio signal through a switch (not shown) as an example. The audio codec 33 may first open the switch coupled to the audio power amplifier 332, such that the audio signal can not be inputted to the audio power amplifier 332, to mute the speaker 36 and the headphone 37, and power down the audio power amplifier 332 thereafter. By performing the above steps can prevent the speaker 36 and the headphone 37 from generating pop noises. It can be noted that a person skilled in the art shall be able to configure the audio codec 33 to be programmable and implement the function of the timer 331 through firmware, software, or the like. The present disclosure uses the audio codec 33 as the function unit of the hardware for illustration, and the present disclosure is not limited thereto.

The power management unit 34 is an integrated management microcontroller, and integrates and manages multiple independent power management chips, such as a low dropout regulator (LDO), DC-DC converter (DC/DC), and the like. The power management unit 34 is coupled to the battery 35. The power management unit 34 enables the power generated by the battery 35 to have higher power conversion efficiency and lower power consumption. In the instant embodiment of present disclosure, the power management unit 34 supplies driving voltages 1.8V/3.3V/5V to the processing unit 32 and the audio codec 33 to power the operations of the processing unit 32 and the audio codec 33. The power management unit 34 interrupts driving voltages supplied or supplies driving voltage to the units coupled thereto upon receiving the power-down signal or the power-on signal generated by the processing unit 32.

Figure 4:
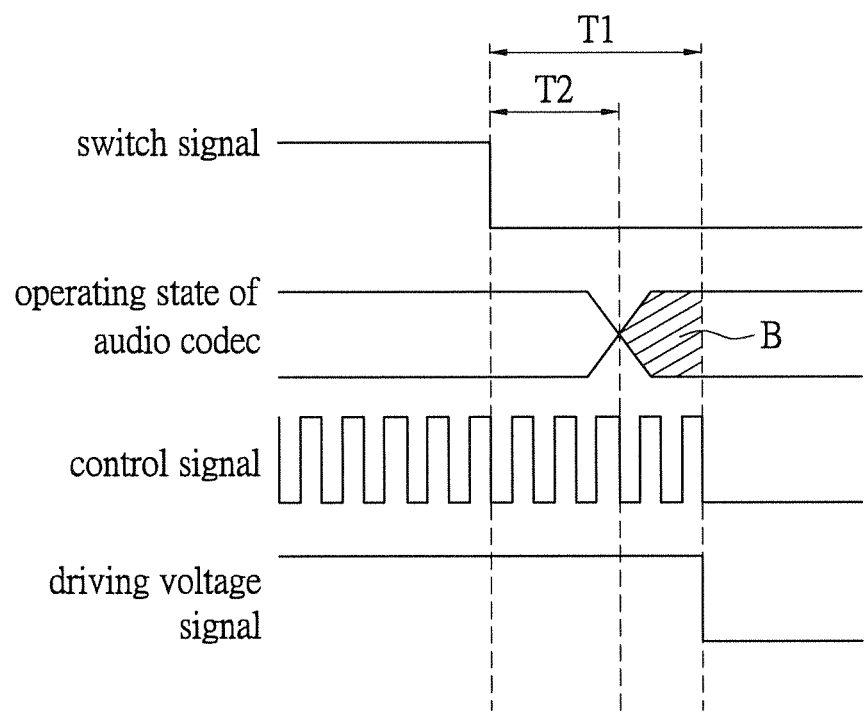
FIG. 4 is a waveform diagram illustrating an operation of the electronic apparatus provided according to the exemplary embodiment of the present disclosure.

Please refer FIG. 3 in conjunction with FIG. 4, wherein FIG. 4 shows a waveform diagram illustrating an operation of the electronic apparatus provided according to the exemplary embodiment of the present disclosure. For example, when the switch 31 has been pressed by a user, the logic level of the switch signal generated by the switch 31 changes from a logic high level to a low logic level, and the processing unit 32 starts to count. The processing unit 32 outputs the power-down signal to the power management unit 34 after having counted to the first predetermined time T1. Next, the power management unit 34 stops supplying driving voltages to the units coupled to the power management unit 34 upon receiving the power-down signal generated by the processing unit 32. However, when the processing unit 32 receives the switch signal, the audio codec 33 also at the same time receives the switch signal generated by the switch 31. More specifically, when the audio codec 33 detects that the logic level of the switch signal has changed from a logic high level to a low logic level, the audio codec 33 initiates the timer 331 to start counting. The audio codec 33 further executes the power-down procedure after the timer 331 has counted to the second time T2.

Figure 2:
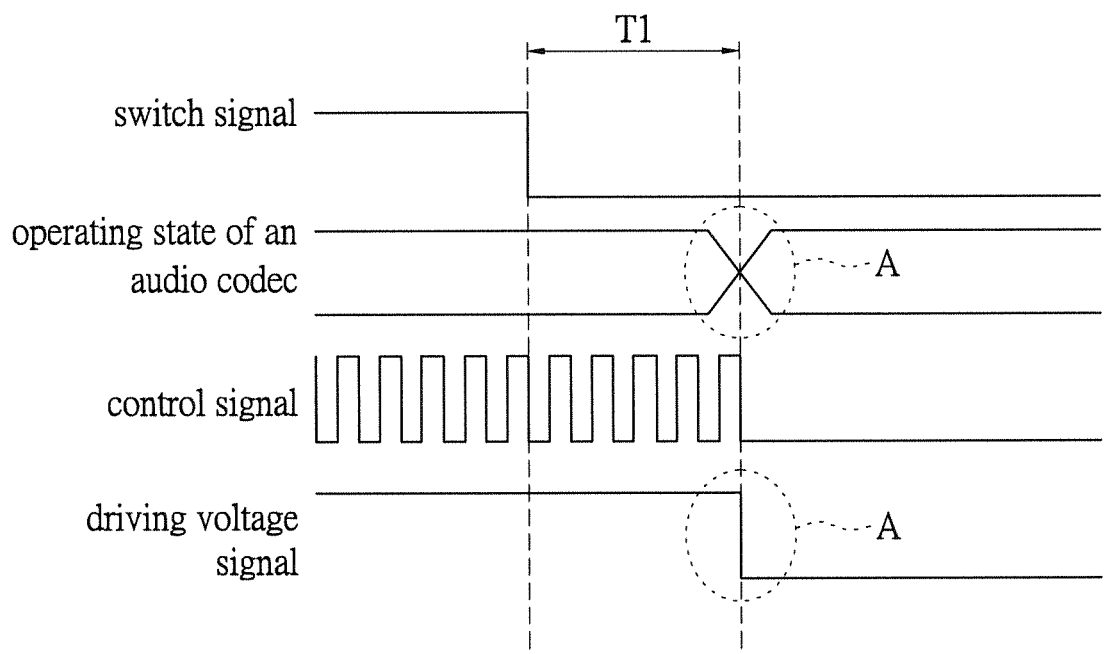
FIG. 2 is a waveform diagram illustrating an operation of the conventional electronic apparatus.

As shown in the region B of FIG. 4, the duration of the second time T2 is less than the duration of the first predetermined time T1, such as 30~80% of the first predetermined time T1. That is, the audio codec 33 reserves a time interval, which is equal to the second time T2 subtracts the first predetermined time T1, for the completion of the power-down procedure. After the audio codec 33 has completed the power-down procedure and the processing unit 32 has counted to the first predetermined time T1, the processing unit 32 generates a power-down signal. The power management unit 34 stops supplying driving voltages to the processing unit 32 and the audio codec 33 connected thereto upon receiving the power-down signal. In other words, in the instant embodiment before the power management unit 34 receives the power-down signal and stops powering the processing unit 32 and the audio codec 33, the audio codec 33 has already completed the power-down procedure. Therefore, when driving voltages supplied to the processing unit 32 and the audio codec 33 has been interrupted, the audio codec 33 has already shutdown the operation of the audio power amplifier 332 normally. Accordingly, when the electronic apparatus 3 being operated to hard power off, the electronic apparatus 3 does not generate pop noise like the conventional electronic apparatus (e.g., the region A is shown in FIG. 2).

Figure 5:
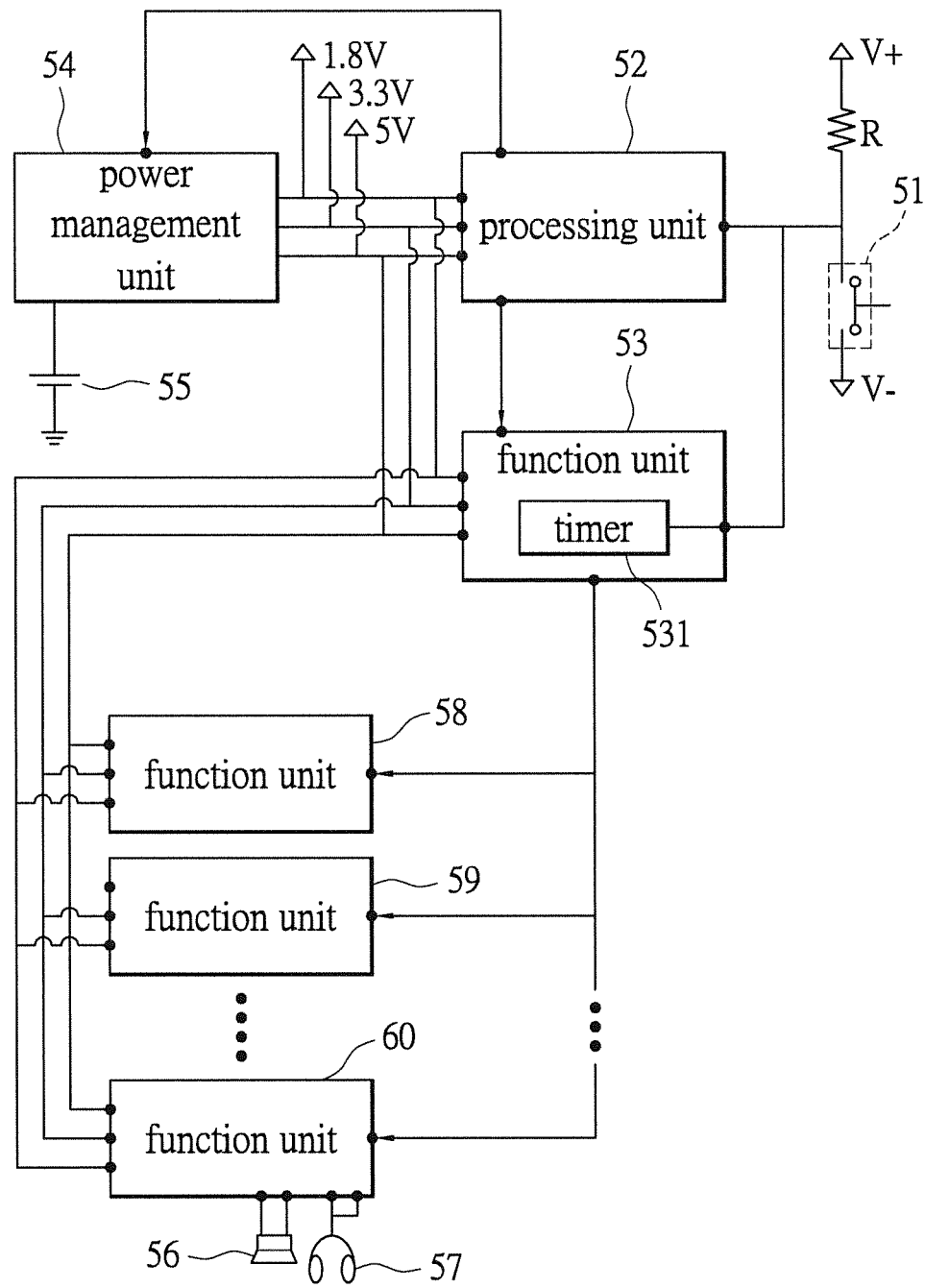
FIG. 5 is a circuit diagram of the electronic apparatus provided according to another exemplary embodiment of the present disclosure.

Please refer to FIG. 5, which shows a circuit diagram illustrating the electronic apparatus provided according to another exemplary embodiment of the present disclosure. The electronic apparatus 5 includes a switch 51, a processing unit 52, a plurality of function units 53, and 58~60, a power management unit 54, a battery 55, and a resistor R. The function unit 53 includes a timer 531. The resistor R is coupled to a logic high level V+. A first end of the switch 51 is coupled to the resistor R, and a second end of the switch 51 is coupled to a logic low level V−. When the switch 51 has been pressed (e.g., i in a close state), the first end and the second end of the switch 51 conducts; when the switch 51 has not been pressed (e.g., in an open state), the first end and the second end of the switch 51 are electrically isolated from each other. The processing unit 52 and the function unit 53 are coupled to the first end of the switch 51. The timer 531 of the function unit 53 is coupled to the first end of the switch 51. The processing unit 52 is coupled to the power management unit 54. The processing unit 52 is coupled to the function unit 53. The processing 52 and the function units 53, 58~60 receive driving voltages 1.8V/3.3V/5V supplied by the power management unit 54. The power management unit 54 is coupled to one end of the battery 55, and the other end of the battery 55 is coupled to a ground. The function unit 53 further is coupled to the function units 53~60, respectively. Additionally, the function unit 60 of the electronic apparatus 5 is coupled to a speaker 56 and a headphone 57. More specifically, the power of the signal outputted by the speaker 56 or the headphone 57 is further amplified by the respective speaker amplifier or the respective headphone amplifier coupled to the function unit 60. For example, the function unit 53 is a built-in audio codec, and the function unit 60 is a higher level audio codec. The operation and the architecture of the switch 51, the processing unit 52, and the power management unit 54 of the electronic apparatus 5 in the instant embodiment are the same as the switch 31, the processing unit 32, and the power management unit 34 of the electronic apparatus 3 depicted in FIG. 3, hence further descriptions are hereby omitted.

The function unit 53, 58~60 may respectively be the audio codec (e.g., described in the embodiment of FIG. 3), the video codec, the backlight driver circuit, the memory unit, or other functional units powered by the power management unit 54 of the electronic apparatus 5. As shown in FIG. 5, the processing unit 52 performs signal transmission with the function unit 53 and control the operation of the function unit 53, accordingly. In the instant embodiment of the present disclosure, the function unit 53 is operable to process the data signal or control signal outputted from the processing unit 52 and control the execution of the power-down procedure of function units 58~60. The function unit 53 further performs signal transmission with the function unit 58~60 and control the operation of other function units 58~60.

For example, when the switch 51 has been pressed by a user, the logic level of a switch signal outputted by the switch 51 changes from a logic high level to a logic low level causing the processing unit 52 to start counting. The processing unit 52 generates and outputs the power-down signal to the power management unit 54 after counted to a first predetermined time T1. Next, the power management unit 54 stops supplying driving voltages to units coupled thereto upon receiving the power-down signal generated by the processing unit 52.

More specifically, when the logic level of the switch signal received by the function unit 53 changes from a logic high level to a low logic level, the timer 531 is triggered to start counting. The function unit 53 executes the power-down procedure to turn off itself or disables a part of its function after the timer 531 has counted to the second time T2.

However, it is worth to note that the difference between the electronic apparatus 3 and electronic apparatus 5 is that the timer 531 of the function unit 53 can control the operations of the function units 58~60. In other word, while the function unit 53 executes the power-down procedure of the function unit 53 after the timer 53 has counted to the second time T2, the function unit 53 outputs the power-down commend to the function units 58~60 to drive the function units 58~60 to each execute the power-down procedure, which includes turning off the respective function units completely or a part of the function of the respective function units. For example, the function unit 53 can controls the speaker amplifier or the headphone amplifier of audio codec 60 to perform the ordinary power-down procedure for prevent the generation of pop noise.

Figure 6:
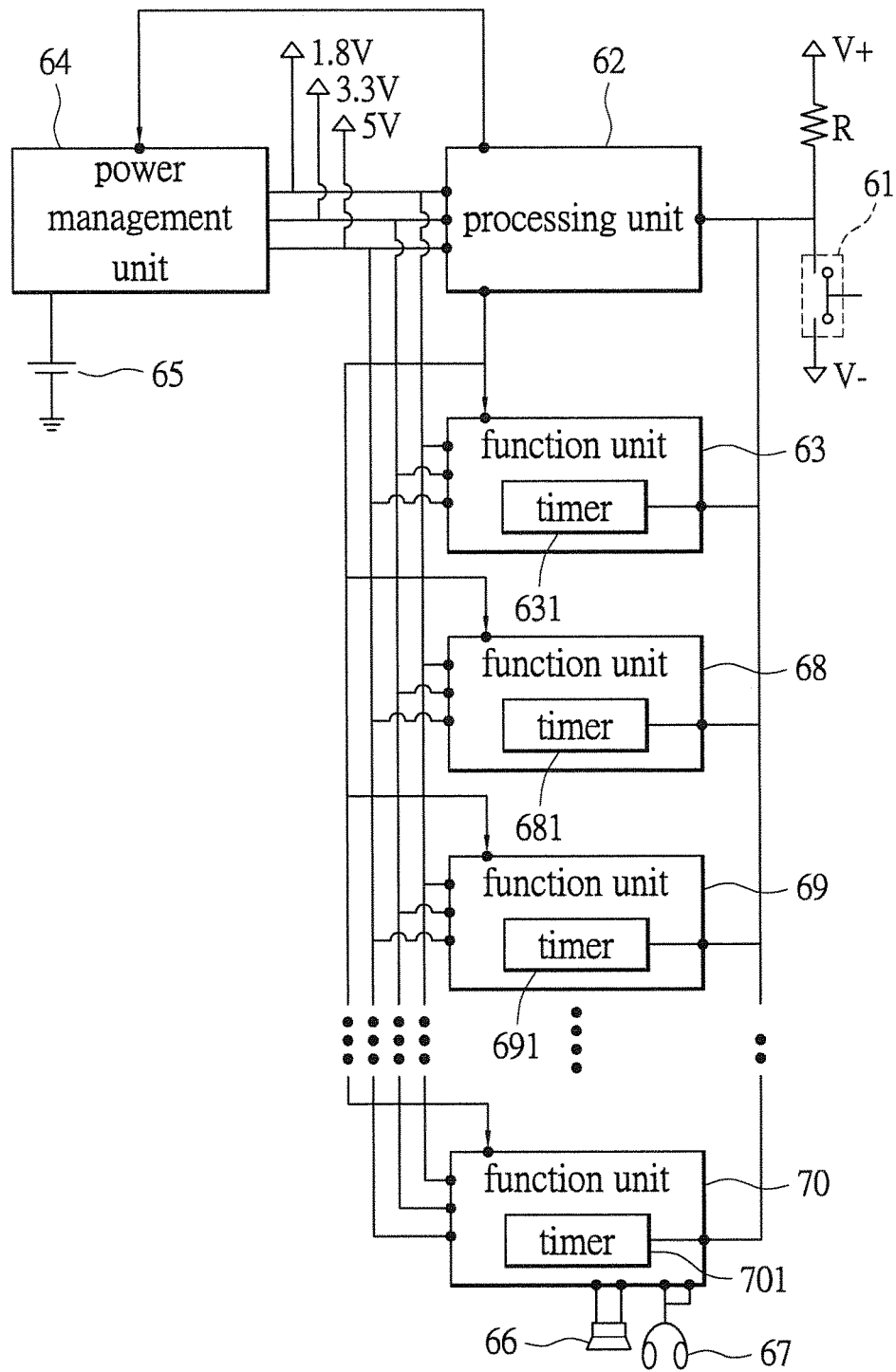
FIG. 6 is a circuit diagram of the electronic apparatus provided according to another exemplary embodiment of the present disclosure.

That is, when driving voltages supplied to the processing unit 52 have being interrupted, all of the function units 53, 58-60 have already been shut down normally. Hence, unlike the conventional electronic device, no errors or false operations, such as errors in writing or reading memory causing damage to memory, or damages to the backlight driver circuit damaging or the like, would happen while the electronic apparatus 5 executing the power shutdown procedures, Please refer to FIG. 6, which shows a circuit diagram of the electronic apparatus provided according to another exemplary embodiment of the present disclosure. In the instant embodiment, the architectures and the operations associated with the switch 61, processing unit 62, and the power management unit 64 of the electronic apparatus 6 are essentially the same as the switch 51, processing unit 52, and the power management unit 54 of the electronic apparatus 5 described in the aforementioned embodiment. Moreover, the coupling relationships among the units/components are as shown in FIG. 6, hence further descriptions are hereby omitted. The difference between the electronic apparatus 5 and 6 is that the function units 63, 68-70 of the electronic apparatus 6 respectively have timers 631, 681~701, while the electronic apparatus 5 only has the timer 531. The timers 631, 681~701 start to count upon detecting that the logic level of the switch signal received changes. Each of the function units 63, 68~70 executes the power-down procedure after the respective timers 631, 681-701 have counted to the second time T2.

For example, when the switch 61 of the electronic apparatus 6 is pressed by the user, the logic level of the switch signal changes from a logic high level V+ to a logic low level V−, and the processing unit 62 starts counting thereafter. The processing unit 62 generates and outputs the power-down signal to the power management unit 64 after counted to the first predetermined time T1. Subsequently, the power management unit 64 stop supplying driving voltage to units connected thereto upon receiving the power-down signal from the processing unit 62.

More specifically, the function units 63, 68~70 drives the respective timers 631, 681~701 to start counting upon detecting that the logic level of the switch signal has changed from a logic high level V+ to a logic low level V−. Then, the function units 63, 68-70 execute the power-down procedure to turn themselves off after the respective timers 631, 681-701 have counted to the second time T2. In other embodiments, the second times T2 for the timers 631, 681~701 can be designed to be different time length.

Figure 7:
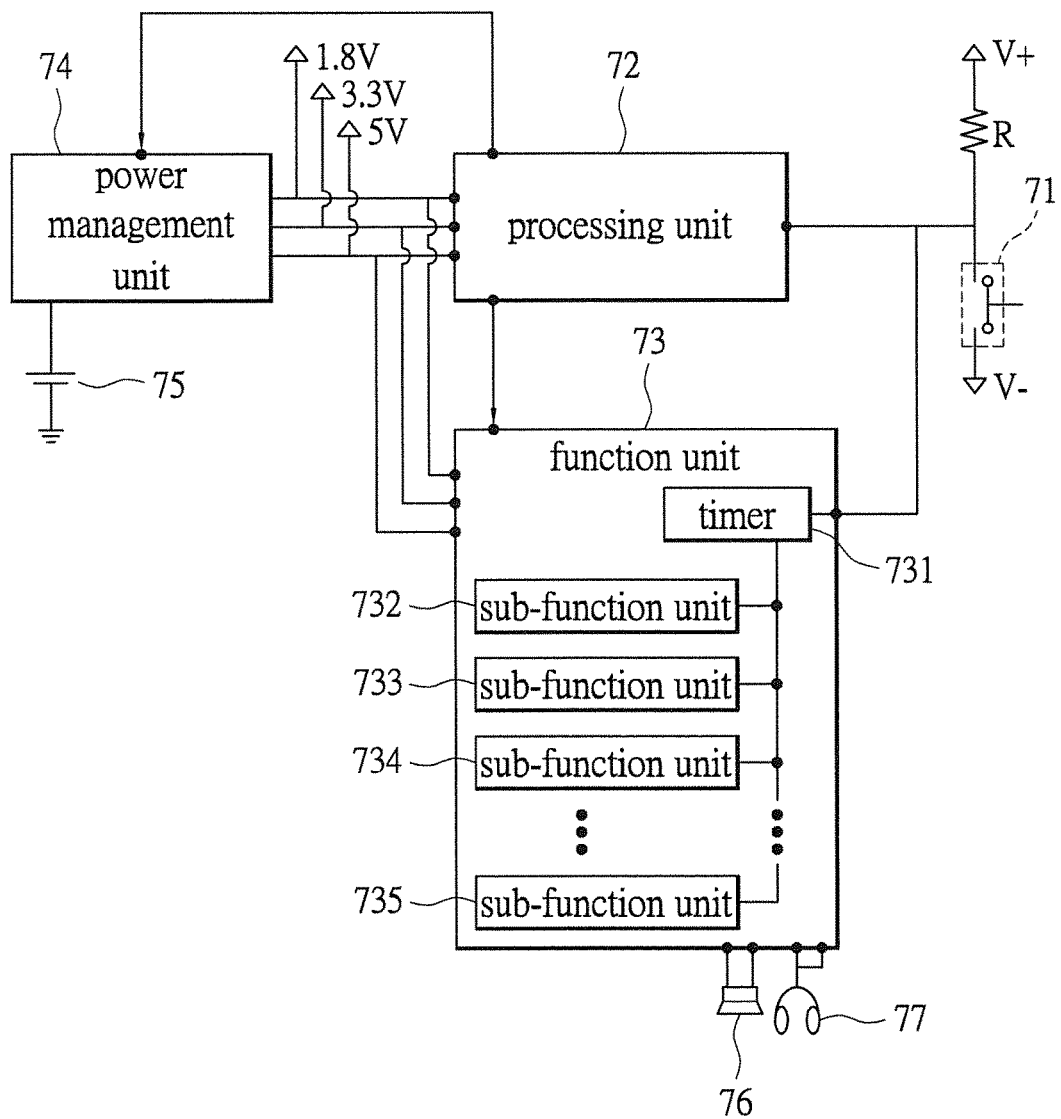
FIG. 7 is a circuit diagram of the electronic apparatus provided according to another exemplary embodiment of the present disclosure.

Furthermore, please refer to FIG. 7, which shows a circuit diagram of the electronic apparatus provided according to another exemplary embodiment of the present disclosure. In the instant embodiment, the architectures and the operations associated with the switch 71, processing unit 72, and the power management unit 74 of the electronic apparatus 7 are essentially the same as the switch 51, processing unit 52, and the power management unit 54 of the electronic apparatus 5 described previously. The coupling relationships among units area as shown in FIG. 7, and further descriptions are hereby omitted. The difference between the electronic apparatus 5 and 7 is that the function unit 73 includes a plurality of sub-function units 732-735. The function unit 73 includes the timer 731 and the sub-function units 732-735. The speaker 76 and the headphone 77 are coupled to the function unit 73. The sub-function units 732-735 are coupled to the timer 731, respectively. The function unit 73 can be a single chip having multiple chip functions integrated therein via hardware or software implementation, wherein the sub-function units 732-735 can be the audio codec chips, the wi-fi module, image processing chip, or the like. Furthermore, the sub-function units 732-735 can also be implemented by software implementation. In another embodiment, the function unit 73 is an audio codec consisting of a plurality of the sub-function units 732-735, wherein the sub-function units 732-735 are function chips including but not limited to the speaker amplifiers, the headphone amplifiers, processors, analog-to-digital converters, digital-to-analog converter, and the like.

When the switch 71 of the electronic apparatus 7 is pressed by the user, the logic level of the switch signal changes from a logic high level V+ to a logic low level V−, and the processing unit 72 starts counting in response to the change in the logic level of the switch signal. The processing unit 72 generates and outputs the power-down signal to the power management unit 74 after counted the first predetermined time T1. The power management unit 74 stops supplying driving voltages (e.g., interrupts the powering operations) to units coupled thereto upon receiving the power-down signal from the processing unit 72. More specifically, the function unit 73 drives the build-in timer 731 to start counting upon detecting that the logic level of the switch signal has changed from a logic high level V+ to a logic low level V−.

It is worth to note, the timer 731 can be designed to couple with the sub-function units 732~735 and count a plurality of time intervals for the sub-function units 732-735. In other words, the sub-function units 732-735 can each execute the power-down sub-procedures to turn off itself after the timer 731 counted to each respective time intervals. Such that, the function unit 73 completes the overall power-down procedure. For instance, while the timer 731 start counting to the second time T2, the sub-function unit 732 can execute a first power-down sub-procedure after the timer 731 counted to a first time interval within the second time T2 and the sub-function unit 733 can execute a second power-down sub-procedure after the timer 731 counted to a second time interval within the second time T2. That is to say, the timer 731 respectively causes the sub-function units 732~735 to turn itself off according to different time intervals to complete the power-down procedure for the function unit 73. The duration of the second time interval is greater than the duration of the first time interval, and the duration of the second time interval is less than the duration of the second time. It is worth to note that the first time interval, the second time interval and the second time T2 start counting simultaneously. For example, the second time is 20 ms, the second time interval is 15 ms, and the first time interval is 10 ms.

Those persons skilled in the art should know that the integration of the aforementioned embodiments is deemed to be encompassed within the scope of the present disclosure.

Figure 8:
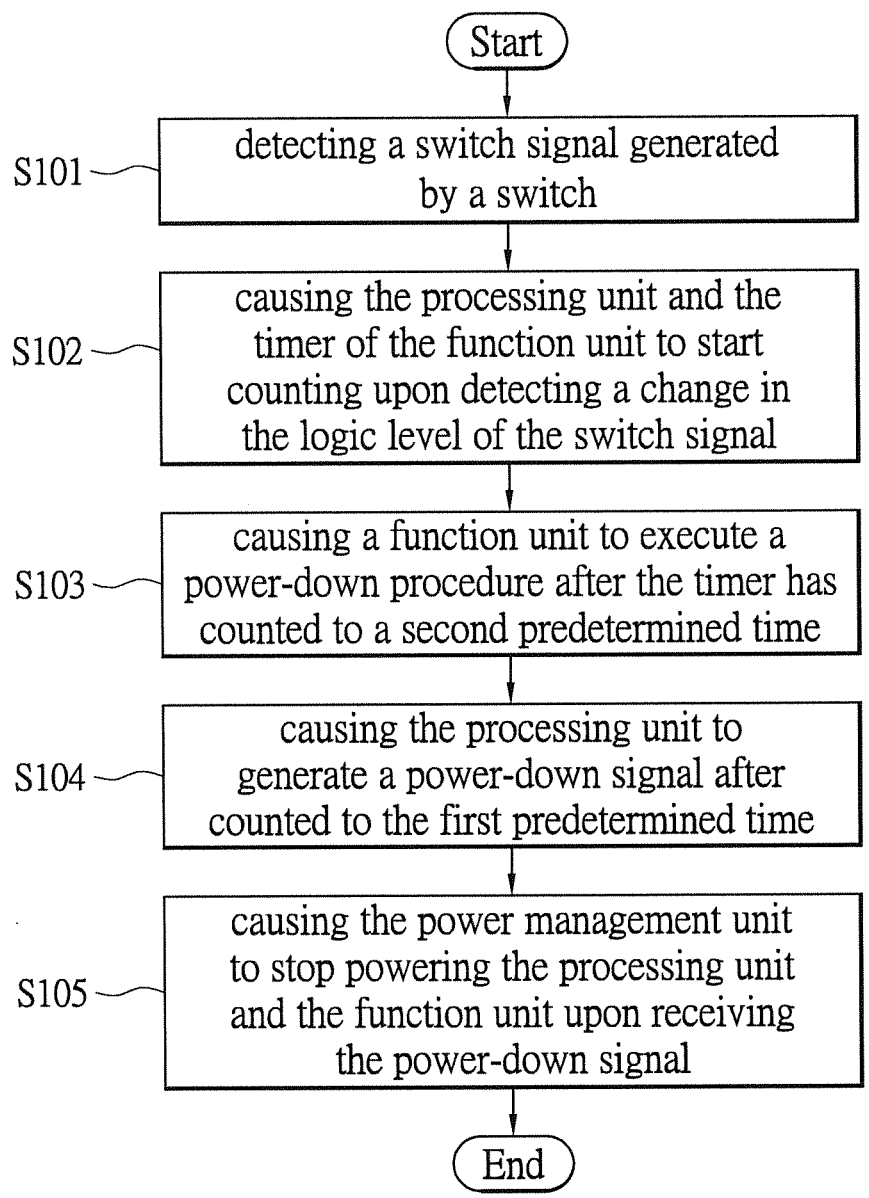
FIG. 8 is a flowchart of power-down method provided according to another exemplary embodiment of the present disclosure.

Please refer to FIG. 8, which shows a flowchart illustrating a power-down method provided according to exemplary embodiment of the present disclosure. The power-down procedure includes the steps S101~S105. In Step S101, a switch signal generated by a switch is detected, i.e., detecting the logic level transition of the switch signal, e.g., high to low logic transition or low to high logic transition. In Step S102, the processing unit and the timer of the function unit start counting upon detecting a change in the logic level of the switch signal. In Step S103, a function unit executes a power-down procedure after the timer has counted to a second time. In Step S104, the processing unit generates a power-down signal after counted to a first predetermined time. The second time is less than the first predetermined time. In Step S105, the power management unit stops powering the processing unit and the function unit upon receiving the power-down signal.

Please refer to FIG. 8 in conjunction with FIG. 3. In Step S101, when the switch 31 of the electronic apparatus 3 has been pressed by the user, the logic level of the switch signal changes from a logic high level V+ to a logic low level V−. Next, in Step S102, the processing unit 32 starts counting upon detecting that the logic level of the switch signal changes from a logic high level V+ to a logic low level V−. At the same time, the audio codec 33 drives the timer 331 to start counting. In Step S103, the audio codec 33 executes the power-down procedure to turn off itself after the timer 331 has counted to the second time T2.

In Step S104, the processing unit 32 generates and outputs the power-down signal to the power management unit 34 after counted the first predetermined time T1. Finally, in Step S105, the power management unit 34 stops supplying driving voltages to the units coupled thereto, i.e., the power management unit 34 stops powering the units coupled thereto In summary, the electronic apparatus, the function unit and the power-down method provided by the present disclosure can prevent the electronic apparatus from malfunctioning caused by hard powering down interrupting the supplying power supplied to the internal circuit when the system of the electronic apparatus crashes. More specifically, the electronic apparatus, the function unit and the power-down method not only can enable the internal circuit of the electronic apparatus to execute the ordinary power-down process during the execution of hard power down process, but also protects the internal circuit and preventing the hard power down from affecting the user experience.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. An electronic apparatus having a switch, the electronic apparatus comprising:
  a processing unit, receiving a switch signal generated by the switch, starting counting upon detecting a change in the logic level of the switch signal, and generating a power-down signal after receiving the switch signal for a first predetermined time;
  a first function unit, receiving the switch signal outputted by the switch, the first function unit comprising:
  a timer, starting counting upon detecting a change in the logic level of the switch signal, and to execute a first power-down procedure after the timer has counted to a second predetermined time; and
  a power management unit coupled to the processing unit and the first function unit;
  wherein the second predetermined time is less than the first predetermined time, and the first function unit completes the first power-down procedure before the power management unit receives the power-down signal and stops powering the processing unit and the first function unit;
wherein the first function unit further comprises:
a first sub-function unit coupled to the timer; and
a second sub-function unit coupled to the timer;
wherein the first sub-function unit executes a first power-down sub-procedure when the timer counts to a first time interval within the second predetermined time;
the second sub-function unit executes a second power-down sub-procedure when the timer counts to a second time interval within the second predetermined time;
wherein the duration of the second time interval is greater than the duration of the first time interval.

2. The electronic apparatus according to claim 1, further comprising:
at least a second function unit coupled to the first function unit;
wherein the first function unit transmits a power-down command to the second function unit during the execution of the first power-down procedure to drive the second function unit to execute a second power-down procedure.

3. The electronic apparatus according to claim 1, wherein the first function unit further comprises:
an audio power amplifier;
wherein when the timer counts to the second predetermined time, the first function unit drives the audio power amplifier to execute a normal power-down procedure.

4. The electronic apparatus according to claim 3, wherein the audio power amplifier is a speaker amplifier or a headphone amplifier.

5. The electronic apparatus according to claim 1, wherein the first function unit is one of an audio codec, a video codec, a memory, and a backlight driver circuit.

6. The electronic apparatus according to claim 1, wherein the switch signal is a continuous signal generated by the switch after being pressed for a sufficient length of time.

7. A function unit coupled to a power management unit and a processing unit, the processing unit and the function unit coupled to a switch to receive a switch signal generated by the switch, and the processing unit generating a power-down signal after receiving the switch signal for a first predetermined time, the function unit comprising:
a timer, starting counting upon detecting a change in the logic level of the switch signal, and to execute a power-down procedure after the timer has counted to a second predetermined time;
wherein the second predetermined time is less than the first predetermined time, and the function unit completes the power-down procedure before the power management unit receives the power-down signal and stops powering the processing unit and the function unit;
the function unit further comprises:
a first sub-function unit coupled to the timer; and
a second sub-function unit coupled to the timer;
wherein the first sub-function unit executes a first power-down sub-procedure when the timer counts to a first time interval within the second predetermined time;
the second sub-function unit executes a second power-down sub-procedure when the timer counts to a second time interval within the second predetermined time;
wherein the duration of the second time interval is greater than the duration of the first time interval.

8. The function unit according to claim 7, wherein the function unit is one of an audio codec, a video codec, a memory, and a backlight deriving circuit.

9. A power-down method for an electronic apparatus, the power-down method comprising:
detecting a switch signal generated by a switch of the electronic apparatus;
causing a processing unit and a timer of a function unit to start counting upon detecting a change in the logic level of the switch signal;
causing the processing unit to generate a power-down signal after counted to a first predetermined time;
causing the function unit to execute a power-down procedure when the timer counts to a second predetermined time, wherein the second predetermined time is less than the first predetermined time;
causing a power management unit to stop powering the processing unit and the function unit upon receiving the power-down signal;
wherein the function unit completes the power-down procedure before the power management unit receives the power-down signal and stops powering the processing unit and the function unit;
the function unit further comprises a first sub-function unit and a second sub-function unit:
causing the first sub-function unit to execute a first power-down sub-procedure when the timer counts to a first time interval within the second predetermined time;
causing the second sub-function unit to execute a second power-down sub-procedure when the timer counts to a second time interval within the second predetermined time;
wherein the duration of the second time interval is greater than the duration of the first time interval.

* * * * *